United States Patent Office 2,739,153
Patented Mar. 20, 1956

2,739,153
TETRAHYDROBENZO [1.2,4.5] DIPYRAZOLE COLORING MATERIALS AND METHOD OF MANUFACTURE

John Williams, Rochester, N. Y., assignor to Eastman Kodak Company, Rochester, N. Y., a corporation of New Jersey No Drawing. Application January 22, 1953,
Serial No. 332,775

6 Claims. (Cl. 260—310)

This invention relates to new coloring materials and method for the preparation thereof. More particularly this invention concerns colored compounds obtained when certain acylpyrazolones are subjected to a bimolecular type condensation.

While there are numerous kinds or varieties of dyes, pigments and the like coloring materials on the market at the present time, there is still a demand for new and different coloring materials. For example, for the coloring of plastics there is the requirement for relatively high melting materials which will withstand a reasonable degree of heating without decomposition. In other instances it may be desired that the coloring material be soluble to some extent for use in a manner analogous to dyeing.

After extended investigation, I have found, as will be described in detail hereinafter, that certain pyrazolones may be caused to undergo a type of condensation resulting in the production of new coloring materials of various degrees of solubility and color as will be explained in the description which follows.

This invention has as one object the production of new coloring materials from certain pyrazolones. Another object is to provide a method for the manufacture of the aforementioned coloring materials. Still another object is to prepare new material by a bimolecular type of condensation as applied to certain acylpyrazolones. Another object is to prepare new coloring materials having various degrees of solubility, or insolubility, and of colors, for example, from bluish magenta to purplish. A specific object is to provide a method for the condensation of 3-acylpyrazolones to give coloring materials for use in coloring plastics and various other materials. Other objects will appear hereinafter.

In the broader aspects of my invention I have found in the course of studying 3-acylpyrazolones that these compounds readily undergo a bimolecular type condensation to form colored compounds according to the reaction

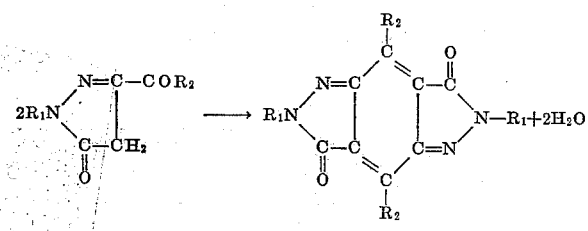

where $R_1$ and $R_2$ represent H, alkyl, aryl, substituted alkyl, substituted aryl, alicyclic or heterocyclic groups. These coloring materials are of considerable stability and brilliance that they are of great value in their application, for instance, as plastic colorant, in photography and in the graphic arts.

The following compounds will illustrate the general aspects of the present invention without limiting it:

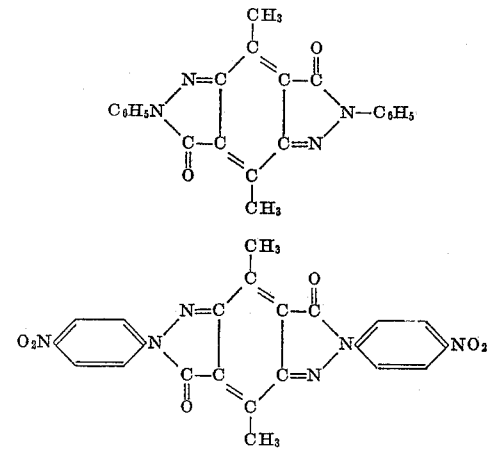

In general, I prefer to carry out my condensation in an organic acid-amide environment in that, for example, when 3-acylpyrazolones are refluxed in glacial acetic acid and acetamide, my condensation takes place as follows:

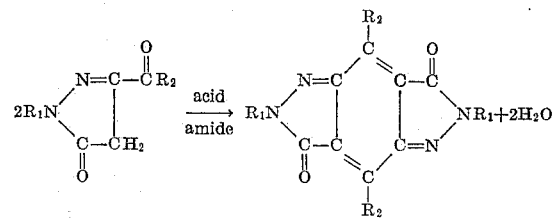

However, in place of part or all of the acetic acid there may be used acetic anhydride. Likewise the acetamide may be replaced or supplemented by concentrated $H_2SO_4$. As will be observed from the examples and other description which follows, certain other changes may be made in the method of preparation.

For a more complete understanding of my invention several detailed examples will now be set forth for illustrating certain preferred embodiments.

EXAMPLE I.—4,8-DIMETHYL-3,7-DIOXO-2,6-DIPHENYL-2,3,6,7-TETRAHYDROBENZO[1.2,4.5]DIPYRAZOLE 1-phenyl-3-acetyl-5-pyrazolone (13.6 g.) is refluxed in 300 ml. of glacial acetic acid containing 2 g. of acetamide for 5 hours. The solution is cooled and poured into 300 ml. of cold water. The solid is collected, washed with cold water, and dried. Yield 9.4 g., M. P. 302–304°.

Anal.—Calc. for $C_{22}H_{16}N_4O_2$: C, 71.7; H, 4.35; N, 15.2. Found: C, 72.1; H, 4.4; N, 14.9.

*1-phenyl-3-acetyl-5-pyrazolone (intermediate for 1)*

This compound was prepared as described in Br. Pat. 585,780, Example 7. M. P. 140–141°. Br. Pat. 585,780 gives a M. P. of 118°.

Anal.—Calc.: C, 65.4; H, 4.95; N, 13.9. Found: C, 65.4; H, 5.0; N, 14.0.

EXAMPLE II.—4,8-DIMETHYL-3,7-DIOXO-2,6-BIS(4-NITROPHENYL)-2,3,6,7-TETRAHYDROBENZO[1.2,4.5]DIPYRAZOLE 1-(p-nitrophenyl)-3-acetyl-5-pyrazolone (2 g.) is refluxed in 100 ml. of glacial acetic acid containing 0.2 g. of acetamide for 10 hours, and further procedure of cooling etc. of Example I is followed. Yield 1 g., M. P. > 400°.

Anal.—Calc. for $C_{22}H_{14}N_6O_6$: C, 57.6; H, 3.3; N, 18.3. Found: C, 56.6; H, 3.0; N, 17.6.

*1-(p-nitrophenyl)-3-acetyl-5-pyrazolone (intermediate for II)* p-Nitroaniline (1/10 mole) was diazotized as described in K. H. Saunders "The Aromatic Diazo-Compounds and Their Technical Applications," p. 6. The diazonium solution was added to a solution of ethyl β,β-diacetyl propionate (1/10 mole) and 200 ml. of acetone. The mixture was made basic with the addition of sodium acetate. The solid formed was heated with 200 ml. of 10% sodium carbonate solution at 95° for one hour. The product was isolated by acidification of the carbonate solution. It was recrystallized from aqueous alcohol. Yield 4.5 g., M. P. 165°.

*Anal.*— C, H analyses could not be obtained due to violent decomposition of material on heating. Calc. N, 17.0. Found: N, 18.4.

EXAMPLE III.—4,8-DIMETHYL-3,7-DIOXO-2,6-BIS(3,5-DICARBOXYPHENYL)-2, 3, 6, 7 - TETRAHYDROBENZO[1.2,4.5]DIPYRAZOLE

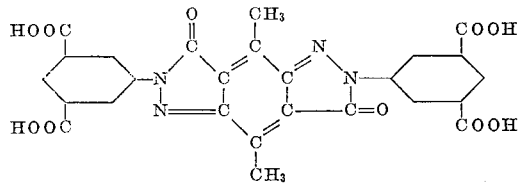

5-aminodimethylisophthalate (1/10 mole) was dissolved in 50 ml. of 6 N hydrochloric acid and diazotized with a solution of sodium nitrite at 0° C. The diazonium solution was added to a solution of ethyl β,β-diacetylpropionate (1/10 mole), 200 ml. of acetone, and 100 ml. of pyridine. The azo dye was isolated with the addition of water. The solid was heated with 200 ml. of 10% sodium carbonate at 95° for one hour. On acidification a precipitate formed. This material was refluxed in glacial acetic acid for six hours. The product was filtered. Yield 4 g., M. P.>400°. Product is only slightly soluble in most organic solvents. The following is the analysis for the compound of Example III: 4,8-dimethyl - 3,7 - dioxo - 2,6 - bis(3,5 - dicarboxy - phenyl) - 2,3,6,7 - tetrahydrobenzo(1.2,4.5)dipyrazole. Calc. for $C_{26}H_{16}N_4O_{10} \cdot C_2H_4O_2$: C—55.6%; H—3.3%; N—9.3%. Found: C—56.2%; H—3.1%; N—8.3%.

EXAMPLE IV.—4,8- DIMETHYL - 3,7 - DIOXO-2,6-BIS(4-SULFAMYLPHENYL)-2,3,6,7 - TETRAHYDROBENZO[1.2,4.5]DIPYRAZOLE p-Aminobenzenesulfonylamide was reacted as in Example III. Yield 8 g., M. P.>400°. Solubility characteristics are the same as Example II product. The following is the analysis of Example IV: Calc. for $C_{22}H_{18}N_6O_6S_2 \cdot H_2O$: C, 48.5; H, 3.7; N, 15.4; S, 11.7. Found: C, 48.9; H, 3.5; N, 15.2; S, 11.6.

It will be observed from the above examples that several different radicals have been incorporated in the condensation products and that the condensation took place as earlier described. That is in Examples I ($R_1=C_6H_5$, $R_2=CH_3$) and II

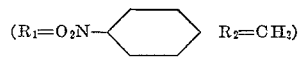

and in Examples III

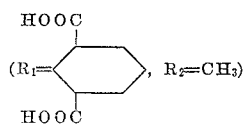

and IV

Compound I is readily soluble in organic solvents, compounds II, III and IV are little soluble in organic solvents. Compounds III and IV are soluble in alkali, but the coloring materials of III and IV have relatively flat absorption curves. Examples III and IV are also pH sensitive, that is, they are indicator dyes exhibiting brilliant colors when acidified.

In view of the solubility characteristics, brilliance and the like discussed above, the new materials of the instant invention may be employed for various purposes. For example, most of the compounds have sufficiently high melting points without decomposition, so that they may be milled into or otherwise incorporated with plastic molding compositions for coloring said plastics. That is, any of the various plastics such as cellulose esters, ether, vinyls, polystyrenes, may have incorporated therewith, for example, from about 2 to 30 percent by weight of the above described coloring materials for imparting a purplish type color thereto or the soluble compounds of Example I may be employed in the usual manner that soluble color materials are employed for coloring various items.

In the above process in place of the acid or anhydride-amide environment for refluxing other environments such as dioxane and substituted alcohol may be employed. Also in some instances, condensation will take place without a catalyst, such as acetamide or concentrated $H_2SO_4$ but prolonged heating is necessary. Likewise my coloring materials may be used as pigments in preparing printing inks, opaque finishes and the like.

I claim:

1. As a composition of matter, the compound having the formula:

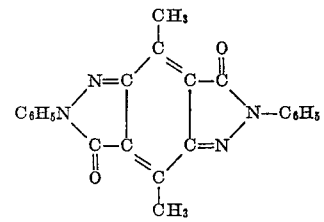

2. As a composition of matter, the compound having the formula:

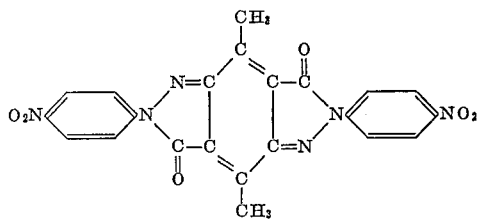

3. As a composition, the compound having the formula:

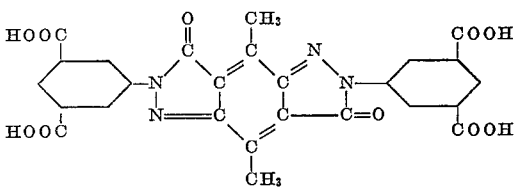

4. As a new compound, 4,8-dimethyl-3,7-dioxo-2,6-bis - (4 - sulfamylphenyl) - 2,3,6,7-tetrahydrobenzo - [1.2,4.5]dipyrazole.

5. The process comprising refluxing 1-phenyl-3-acetyl-5-pyrazolone in glacial acetic acid and acetamide for several hours, cooling and drowning out the resultant solution in cold water to obtain a precipitate which is filtered off, washed and dried.

6. The process comprising dissolving an aminodimethylisophthalate in hydrochloric acid, diazotizing the same with a solution of sodium nitrite, adding the diazonium solution to a solution of ethyl β,β-diacetylpropionate in acetone and pyridine to obtain an azo dye which azo dye is isolated and heated with sodium carbonate whereby upon acidification a precipitate is formed and refluxing this precipitate in glacial acetic acid for several hours.

References Cited in the file of this patent

Pummerer et al.: Chem. Berichte, vol. 84, pp. 583–90 (1950).

Vesely: Chem. Abstracts, vol. 31, col. 5355 (1937), Abstract of article from Czech. Collection.

Ruggli et al.: Helv. Chim. Acta, vol. 21, pp. 1084–1100 (1938).